2,787,583

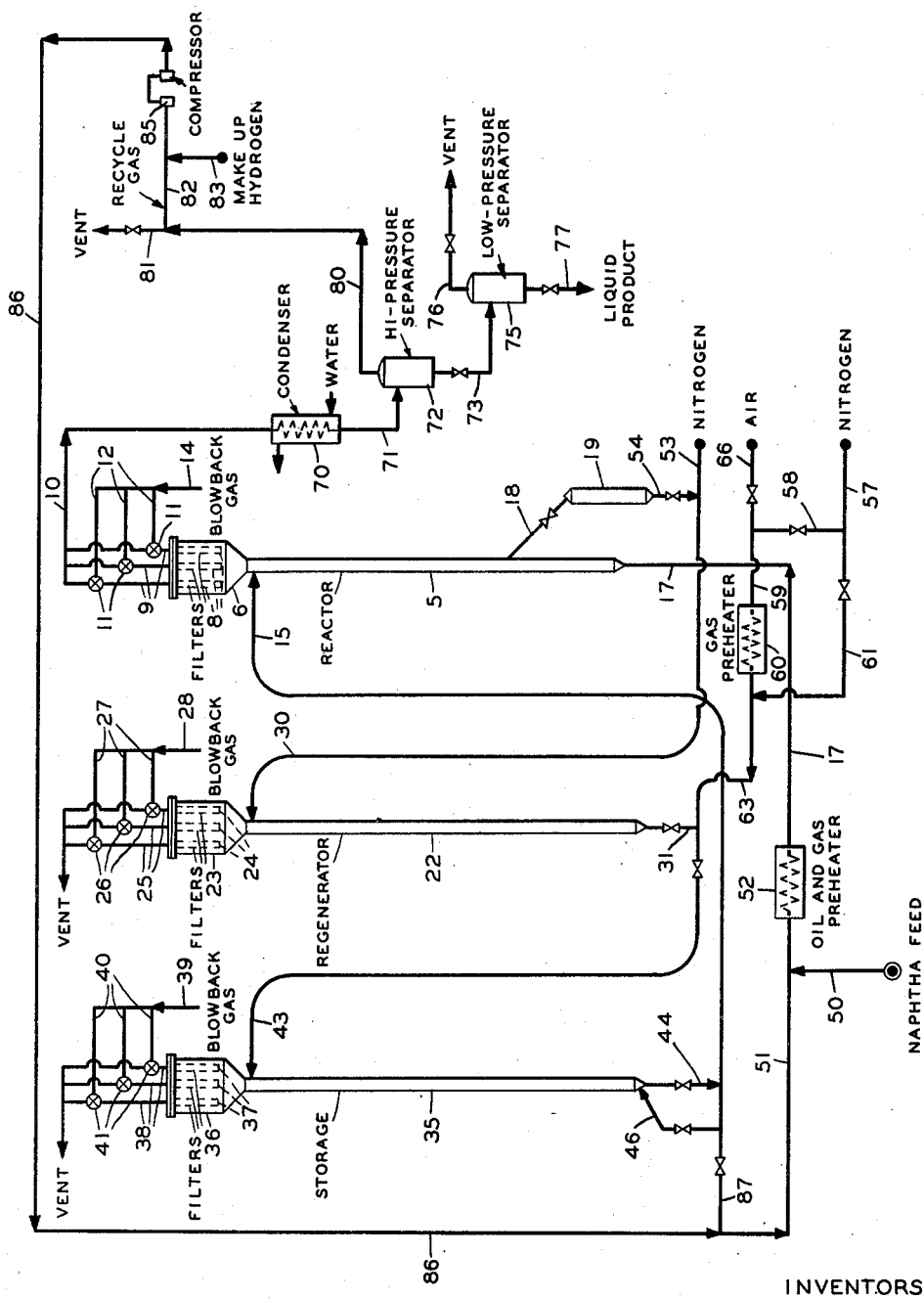

NAPHTHA HYDROFORMING PROCESS

Henry G. McGrath, Union, and Martin R. Smith, Glen Ridge, N. J., assignors to The M. W. Kellogg Company, Jersey City, N. J., a corporation of Delaware Application August 24, 1954, Serial No. 451,853

6 Claims. (Cl. 196—50)

This invention relates to an improved fluid hydroforming process and, more particularly, it pertains to a fluid hydroforming process which is operated under essentially non-regenerative conditions to produce a gasoline product of high anti-knock quality.

At the present time, considerable interest is being shown in developing processes for the production of high anti-knock gasoline products. For this purpose, platinum catalysts are being used extensively, however, in view of the demand for increased octane number, investigations are being conducted to find the best technique by which high octane quality gasoline products of at least 95 CFRR clear can be produced. Along this line of development, serious consideration is being given to a two-stage process, the first step involving the treatment of the naphtha under conditions suitable essentially for the dehydrogenation of naphthenes and a subsequent stage being operated under conditions to produce the high quality product. By virtue of the relatively milder treatment of the naphtha fraction in the first stage as compared to the second stage, the conditions in the first stage can be selected on the basis of producing a non-regenerative operation. Accordingly, the process can be operated for an indefinite period of time without need for the regeneration of the catalyst. This invention is mainly concerned with providing a suitable process for the initial treatment of a naphtha fraction as a preliminary step in the production of high octane quality product.

In accordance with the present invention, a fluid hydroforming process is provided in which the naphtha fraction is contacted with a fluidized mass of finely divided catalytic material selected from the group consisting of the oxides and sulfides of metals in groups IV, V and VI of the periodic table in a reaction zone, passing to the reaction zone a hydrogen containing gas in the amount of about 7600 to about 12,500 S. C. F. B., the hydrogen containing gas having a hydrogen concentration of about 55 to about 95% by volume, at a temperature of about 850° to about 975° F., and maintaining a hydrogen partial pressure within the reaction zone of about 330 to about 440 p. s. i. g.

The catalyst to be used for the purpose of the present invention comprises a catalytic element selected from the group consisting of the oxides and sulfides of metals in groups IV, V and VI of the periodic table. This catalytic element can be used alone or it can be supported on a carrier material such as, for example, alumina, silica-alumina, kieselguhr, pumice, activated charcoal, zinc aluminate, magnesia, alumina-magnesia, etc. Among the various catalytic elements which are useful for the purpose of this invention, it is preferred to use the oxides and/or sulfides of the left-hand metals of group VI. The preferred metals are chromium, molybdenum and tungsten. The catalytic element in combination with the carrier material constitutes about 0.1 to about 30% by weight of the total catalytic material, preferably about 1 to about 25%, on the same basis. The catalytic element has the properties of hydrogenating and dehydrogenating hydrocarbon materials or it has the property of aromatizing various types of hydrocarbon materials by dehydrogenation, isomerization, dehydrocyclization, etc. Specific examples of catalytic materials which can be used in the practice of the present invention are chromia-alumina, molybdenum trioxide-alumina, chromia-alumina containing $K_2O$, tungsten sulfide-silica-alumina, vanadium oxide-zinc aluminate, etc. Although the catalytic materials are well adapted as hydroforming agents, it is also desirable to employ a small amount of silica in the amount of about 1 to about 12% by weight, based on the total catalytic material in order to stabilize alumina at elevated temperatures.

The feed material is a naphtha fraction having an initial boiling point of about 75° to about 220° F. and an end point of about 350° to about 450° F. The feed material can be a straight run or virgin stock, a cracked naphtha or a mixture of the two. Essentially all naphtha fractions contain naphthenic compounds and, in the case of the present invention, the naphtha feed contains about 5 to about 70–80% by volume of naphthenic compounds. The naphthenic compounds are readily dehydrogenated to aromatics, consequently, the feed material is upgraded in octane quality without the need of employing severe operating conditions. The dehydrogenation reaction takes place most readily among the various reactions which occur in reforming systems. In this regard, the dehydrogenation of six-membered ring naphthenes takes place first; whereas the five membered ring naphthenic compounds are first isomerized and then dehydrogenated to aromatic compounds. Both of the dehydrogenation reactions take place in the present invention and the conditions are selected such that the dehydrogenation reactions constitute the principal reactions within the process. The feed material can be of the low octane quality such as at least about 20 CFRR clear and it can be as high as 75 CFRR clear. The olefin concentration can range from about 0 to about 30%, although in the case of straight run stocks, the olefin concentration varies from about 0 to about 3 mol percent. The sulfur concentration of the material is in the range of about 0 to 3% by weight, more usually, about 0.01 to about 2% by weight. For the purpose of this invention, it is preferred to use a straight run stock by reason that this material can be readily treated or processed under conditions in which no carbon is produced.

In the practice of the present invention, the conditions of operation are selected such that no carbon is produced, or it is produced in such quantities that the reaction can take place for a period of about 1500–2000 hours without the need for regeneration. For this purpose, the conditions are selected to produce a gasoline product having an octane number of at least about 65 CFRR clear. A lower octane quality product can be readily produced under conditions requiring no regeneration, however, it is not within the scope of this invention to include those operations which are of such a mild nature that very little upgrading is effected. For this purpose, the temperature is from about 850° to 975° F., more usually, about 875° to about 940° F. The total pressure of the reaction can vary from about 400 to about 1200 p. s. i. g., although more usually, this pressure will range from about 500 to about 1000 p. s. i. g. The reaction is effected in the presence of added hydrogen. The hydrogen containing gas is obtained by recycling a portion of the normally gaseous material which is produced in the process. Accordingly, the hydrogen rate can vary from about 7600 to about 12,500 standard cubic feet, measured at 60° F. and 760 mm. Hg, per barrel of oil feed, abbreviated as S. C. F. B. More usually, the hydrogen rate varies from about 7800 to about 11,000 S. C. F. B. The conditions of operation are selected to provide a net production of hydrogen. Consequently, the process can be operated without the need of extraneous hydrogen. In this connection, the normally gaseous material which is produced in the process is recycled to the reforming zone and this hydrogen containing gas usually contains about 55 to about 95%, more usually about 55 to 80%, by volume of hydrogen. By virtue of the relative quantity of hydrogen feed to oil feed, the hydrogen partial pressure in the reaction zone, measured on an inlet basis, is about 330 to about 440 p. s. i. g. The hydrogen rate and the hydrogen partial pressure are essential to the operation in order to obtain a non-regenerative system. This will be explained in greater detail hereinafter. The amount of oil which is processed relative to the amount of catalyst which is present in the reaction zone is measured on the basis of the weight space velocity, that is, the pounds of oil being charged to the reaction zone per hour per pound of catalyst present therein. In this connection, the weight space velocity can vary from about 0.05 to about 10, although more usually, it varies from about 0.25 to about 2. Since the operation is essentially non-regenerative, there is no need to circulate catalyst continuously from the reaction zone to a regeneration zone for the purpose of regeneration. Accordingly, it is contemplated by means of this invention to employ a catalytic material in a finely divided state without any circulation of catalytic material or until required for limited regeneration. The catalytic material is in a finely divided state having an average particle size of about 1 to about 150 microns, more usually about 5 to about 100 microns. The passage of reactant material through the mass of finely divided catalyst is sufficient to produce a dense fluidized mass. By virtue of the conditions in the reaction zone, the octane improvement is brought about principally by the increase of aromatics concentration in the reformed liquid product.

In order to provide a better understanding of the present invention, reference will be had to the accompanying drawing for the purpose of illustrating specific examples.

In the figure, reactor 5 is an elongated, cylindrical vessel having a diameter of about 3 inches and a length of about 45 feet. Superimposed on the reactor 5 is a disengaging vessel 6 in which are contained filters 8 for the separation of entrained catalyst particles from effluent gaseous materials. The reaction product passes through filters 8 and then leaves the system through lines 9, which then join as a single product line or header 10. In lines 9 there are situated three valves 11 to which are connected lines 12. Lines 12 are in turn connected to common header 14 which provides blow-back gas for the filters 8. Regenerated and/or fresh catalyst is fed to the top part of reactor 5 by means of a transfer line 15. The reactants are fed into reactor 5 by means of line 17, which is connected to the bottom end thereof. Catalyst is withdrawn from the reactor 5 by means of a withdrawal line 18 which is connected to the bottom portion of the reactor 5 about 4 feet from the bottom end thereof. The spent catalyst which is withdrawn from the reactor 5 passes through line 18 and then flows into a spent catalyst drum 19.

The regenerator 22 is an elongated, cylindrical vessel having a diameter of about 3 inches and a length of about 45 feet. Superimposed on the regenerator proper is a disengaging vessel 23 in which are situated three filters 24 for the purpose of separating entrained catalyst particles from the effluent gas. As in the case of the reaction system, the individual filters are connected to the respective vent lines 25 in which there are situated valves 26. In turn, each of valves 26 is connected to a blow-back gas line 27. The blow-back gas line 27 is then connected to a common header 28. Spent catalyst is charged to the top of the regenerator 22 by means of a transfer line 30. The regenerated catalyst is withdrawn from the regenerator by means of a line 31 which is connected to the bottom end thereof. The regenerating gases, e.g., air or oxygen are fed into the bottom of the regenerator through line 31. The conditions of superficial linear gas velocities and catalyst densities in the regenerator vary in the same range as described hereinabove in connection with the reactor.

Storage 35 is an elongated, cylindrical vessel having a diameter of 3 inches and a length of 45 feet. This vessel also contains superimposed on it a disengaging vessel 36 in which are situated three filters 37. The filters serve to separate any entrained catalyst particles from the effluent gas. The effluent gas passes through the filters and into vent lines 38. The filters are cleared of catalyst from the outer surface by means of gas which is fed from a common header 39 and flows periodically through one of the three lines 40, which are connected to suitable valves 41 in lines 38. Catalyst is fed to the top of storage 35 by means of transfer line 43. The catalyst is withdrawn from storage 35 by means of a line 44 which is connected to the bottom end thereof. Recycle gas may be passed into storage 35 by means of a valved line 46 which is connected to the bottom end thereof.

Naphtha feed is supplied through a source 50 and then joins a hydrogen containing gas in line 51 prior to entering oil and gas preheater 52. After attaining suitable preheat, the mixture of naphtha vapor and hydrogen containing gas is charged into the bottom of the reactor via line 17. The spent catalyst is drawn from the bottom part of reactor 5, and is passed to spent catalyst drum 19 and thereafter it is conveyed to the top of regenerator 22 by means of a nitrogen gas stream which is fed through the line 30. In order to transfer regenerated catalyst from regenerator 22 to storage 35 nitrogen is supplied from source 57 for this purpose. This nitrogen may be preheated prior to contact with the regenerated catalyst by passing through line 58 and then through line 59 before entering gas preheater 60. On the other hand, when it is not desired to employ a heated gas stream, the nitrogen is passed through line 61 thereby by-passing preheater 60. The heated or unheated nitrogen gas stream then passes through line 63. The regeneration of catalyst in regenerator 22 is accomplished by passing air through a valved line 66, thence through line 59 and gas preheater 60. The heated air flows from the gas preheater 60 into line 63, and thereby enters the bottom end of the regenerator through line 31.

The reaction product from reactor 5 passes through line 10 and enters a water condenser 70. The condenser 70 is operated under the pressure of the reaction system, and causes the condensation of any materials which are normally liquid at the temperature existing in the condenser. The mixture of gas and liquid leaves the condenser 70 via line 71 and enters the high pressure separator 72. In this separator 72, the pressure is maintained at the highest level which is possible on the basis of reaction conditions, and it provides a means of separating the liquid product from the gases. The liquid product is removed from separator 72 by means of a valved bottom line 73, and thence passes into a low pressure separator 75. In the low pressure separator, the pressure is reduced to atmospheric, thereby causing any of the absorbed gases to be released or flashed and vented overhead through a valved line 76. The flashed liquid product is then removed from the system via valved line 77 and is then passed to a product recovery system (not shown).

The uncondensed material in high pressure separator 72 is removed via line 80. A portion of this high pressure gas can be vented through a valved line 81, or a part of all of this gas can be passed to line 82. If necessary, make-up hydrogen is admixed with the high pressure gas in line 82 by means of line 83. This gas stream is then passed to a compressor 85, wherein the pressure is raised somewhat above the desired operating pressure. Thereafter, the gas is then passed into a recycle gas line 86 from which a portion is passed to line 87 which serves as a means for carrying the catalyst from storage 35 to the top of reactor 5 via transfer line 15. The remainder of the hydrogen containing gas stream is passed to line 51 which was previously discussed.

In operating the process described in the drawing, naphtha was fed from line 50 and then admixed with the hydrogen containing gas flowing through line 51. The mixture of gas and liquid was then heated to a temperature of about 1000° to 1100° F. in preheater 52. The mixture of gas and vapor was then passed upwardly through reactor 5 in which substantially adiabatic operation was maintained. The temperature in the reactor was obtained at serveral points along the length thereof. Spent catalyst was withdrawn from the bottom of the reactor 5 in an intermittent manner, involving a withdrawal of about 5–10 pounds for every four hours of operation. At the time of withdrawing catalyst, nitrogen was passed through line 53 in order to convey the spent catalyst upwardly through line 30 and into the top of regenerator 22. The spent catalyst was then regenerated by passing air through line 66 and nitrogen through line 57 and the valve situated in line 61 was in a closed position. The diluted air was preheated to a temperature of 700° to 900° F. in preheater 60 and then passed into the bottom of regenerator 22 through line 31. During the regeneration treatment, the valve in line 31 was maintained in an open position; whereas the valve in line 43 was maintained closed. At the time that catalyst was withdrawn from reactor 5, catalyst was also withdrawn from regenerator 22 by first opening the valve in the nitrogen lines 61 and then stopping the flow of air into the regenerator by closing the valve in line 66, as well as the valve in transfer line 43. When the catalyst reached a desired top level in the regenerator, all of the regenerated catalyst was passed into the top of storage 35. Before passing the freshly regenerated catalyst into storage 35, catalyst was fed from storage 35 into reactor 5. This operation was effected by opening the valves in lines 44 and 87 and closing the valve in line 46. By so doing, catalyst was picked up from the storage vessel and was conveyed upwardly in transfer line 55 to the top of reactor 5. Between the time that catalyst was withdrawn and fed into storage vessel 35, the hydrogen containing gas was allowed to pass by means of line 46 into the bottom of the storage vessel. In this manner, the molybdena catalyst was subjected to a hydrogen treatment for a period of about 4 hours, prior to being circulated to the reactor. The system is continuous except that the flow of catalyst is effected in an intermittent fashion.

Using the pilot plant described hereinabove, the following naphthas and catalytic material were employed for the purpose of evaluating the present invention. The inspections of the feed stocks and the catalytic materials are presented below in Tables I and II.

Table I

| Feed | A | B |
| --- | --- | --- |
| °API Gravity | 53.1 | 51.9 |
| ASTM Distillation, Vol. percent: | | |
| IBP, ° F | 214 | 220 |
| 5 | 240 | 252 |
| 10 | 250 | 265 |
| 20 | 263 | 281 |
| 30 | 278 | 294 |
| 40 | 293 | 307 |
| 50 | 306 | 320 |
| 60 | 321 | 331 |
| 70 | 336 | 344 |
| 80 | 356 | 359 |
| 90 | 381 | 380 |
| 95 | 400 | 400 |
| E. P | | |
| Octane No., CFRM clear | 34.7 | 30 |
| Aromatics, Vol. percent | 7.0 | 9.0 |
| Olefins, Mol percent | 1.0 | 0.8 |
| Sulfur, Wt. percent | 0.06 | 0.03 |
| Molecular Weight | 129 | 132 |
| Naphthenes, Vol. percent | 39.1 | 38.8 |

Table II

| Catalyst No | I | II | III |
| --- | --- | --- | --- |
| Analysis, Wt. percent: | | | |
| $MoO_3$ | 9.3 | 9.3 | 9.3 |
| $SiO_2$ | 2.5 | 2.5 | 2.5 |
| $Al_2O_3$ | 86.9 | 86.9 | 86.9 |
| $Fe_2O_3$ | 1.3 | 1.3 | 1.3 |
| Roller Analysis, Wt. percent (Reactor Catalyst): | | | |
| 0–10 microns | 4.2 | 3.2 | 1.0 |
| 10–20 microns | 3.8 | 5.7 | 1.7 |
| 20–40 micorns | 11.7 | 20.9 | 14.7 |
| 40–60 microns | 46.8 | 47.2 | 50.2 |
| 60 microns | 33.4 | 23.1 | 32.4 |

The results obtained by means of the fluid operations in the pilot plant described in the accompanying drawing are presented in Table III below.

Table III

| Run No | 1 | 2 | 3 |
| --- | --- | --- | --- |
| Catalyst | II | III | I |
| Feed | B | B | A |
| Temperature, °F. (Ave.) | 916 | 910 | 881 |
| Pressure, p. s. i. g | 750 | 500 | 500 |
| Space Velocity, $W_o/hr/W_c$ | 0.39 | 0.41 | 0.38 |
| C/O Wt. Basis | 0.07 | 0.09 | 0.14 |
| Hydrogen Gas, S. C. F. B | 7,800 | 10,750 | 5,500 |
| Percent $H_2$ in Gas, Vol | 65.2 | 72.3 | 73.3 |
| Superficial Velocity, Ft./sec | 0.26 | 0.50 | 0.25 |
| Hydrogen partial pressure, p. s. i. g | 439.3 | 330.3 | 320.3 |
| Length of run, hrs | 24 | 55 | 24 |
| Yields, Output Basis: | | | |
| 100% $C_4$ Gasoline 400° F. (E. P.), Vol. Percent | 87.9 | 89.7 | 90.5 |
| Butanes, Vol. Percent | 5.2 | 4.7 | 4.4 |
| Polymer 400° F. (IBP), Vol. Percent | 1.8 | 2.0 | 1.6 |
| Hydrogen, S. C. F. B | 292 | 381 | 415 |
| Dry Gas[1], Wt. Percent | 10.3 | 7.5 | 6.7 |
| Carbon, Wt. Percent | No carbon. | No carbon. | 0.01 |
| Octane No., CFRR Clear: | | | |
| 100% $C_4$ Gasoline 400° F. (E. P.) | 77.5 | 74.9 | [2] 68.1 |

[1] $C_1$–$C_3$ hydrocarbons.
[2] CFRM.

From the foregoing table, it is apparent that a hydrogen partial pressure below 330 p. s. i. g. resulted in an operation which produced carbon. This is exemplified by run No. 3. Further, it should be noted that the hydrogen rate fell below the quantity which is necessary for the purpose of this invention. Conversely, runs 1 and 2 fall within the scope of the present invention and they resulted in no carbon being produced. In this connection, it should be noted that the hydrogen rate and the hydrogen partial pressure fell within the scope of the present invention. Accordingly, it is to be seen that for those operations in which no carbon is produced, thus requiring no regeneration, it is essential that the hydrogen rate fall within the range of 7600 to 12,500 S. C. F. B. and the hydrogen partial pressure fall within the range of 330 to 440 p. s. i. g. Further, in both runs under consideration, a substantial amount of hydrogen was produced thus eliminating the need for extraneous hydrogen in order that the process can be operated.

Having thus provided a description of this invention, it should be understood that no undue limitations or restrictions are to be imposed by reason thereof, but that the present invention is to be defined by the appended claims.

We claim:

1. A non-regenerative fluid hydroforming process in which a naphtha fraction is contacted with a fluidized mass of a finely divided catalytic material selected from the group consisting of the oxides and sulfides of metals in groups IV, V and VI of the periodic table in a reaction zone, passing to the reaction zone a hydrogen containing gas in the amount of about 7600 to about 12,500 S. C. F. B., the hydrogen containing gas having a hydrogen concentration of about 55 to about 95% by volume, at a temperature of about 850° to about 975° F. and maintaining a hydrogen partial pressure within the reaction zone of about 330 to about 440 p. s. i. g.

2. The process of claim 1 wherein the catalytic material is an oxide of a group VI metal.

3. The process of claim 1 wherein the catalytic material is molybdenum oxide.

4. A non-regenerative fluid hydroforming process which comprises contacting a naphtha fraction with a fluidized mass of a finely divided catalytic material selected from the group consisting of the oxides and sulfides in groups IV, V and VI of the periodic table in a reaction zone, passing to the reaction zone a hydrogen containing gas in the amount of about 7800 to about 11,000 S. C. F. B., the hydrogen containing gas having a hydrogen concentration of about 55 to about 80% by volume, at a temperature of about 875° to about 940° F., a total pressure of about 500 to about 1000 p. s. i. g., maintaining a hydrogen partial pressure within the reaction zone of about 330 to about 440 p. s. i. g., and thereby producing a high octane quality product of at least 65 CFRR clear octane number.

5. The process of claim 4 wherein the catalytic material comprises an oxide of a group VI metal.

6. The process of claim 4 wherein the catalytic material comprises molybdenum trioxide supported on alumina.

References Cited in the file of this patent

UNITED STATES PATENTS 2,656,304    MacPherson et al. _____ Oct. 20, 1953